United States Patent
Devos et al.

(10) Patent No.: US 11,349,427 B2
(45) Date of Patent: May 31, 2022

(54) CONTROL OF POWER CELLS OF A VARIABLE SPEED DRIVE ON THE BASIS OF RECTIFIED VOLTAGES

(71) Applicant: Schneider Toshiba Inverter Europe SAS, Pacy sur Eure (FR)

(72) Inventors: Thomas Devos, Carrières sous Poissy (FR); François Malrait, Jouy sur Eure (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 23 days.

(21) Appl. No.: 16/707,555

(22) Filed: Dec. 9, 2019

(65) Prior Publication Data
US 2020/0195185 A1    Jun. 18, 2020

(30) Foreign Application Priority Data
Dec. 13, 2018  (FR) ...................................... 1872818

(51) Int. Cl.
H02P 27/06     (2006.01)
(52) U.S. Cl.
CPC ................................... *H02P 27/06* (2013.01)
(58) Field of Classification Search
CPC ...................................................... H02P 27/06
See application file for complete search history.

(56) References Cited

U.S. PATENT DOCUMENTS

| | | | |
|---|---|---|---|
| 6,205,042 B1* | 3/2001 | Bixel ...................... | H02M 7/49 363/95 |
| 2016/0072395 A1* | 3/2016 | Deboy .............. | H02M 3/33592 363/21.1 |
| 2017/0244325 A1* | 8/2017 | Carralero .......... | H02M 3/33546 |

FOREIGN PATENT DOCUMENTS

| CN | 108933543 | 12/2018 |
|---|---|---|
| DE | 102014008399 | 12/2015 |

OTHER PUBLICATIONS

English Language Machine Translation of German Patent Application Publication No. DE102014008399, published on Dec. 17, 2015, 11 pages.

(Continued)

*Primary Examiner* — Kawing Chan
*Assistant Examiner* — Bradley R Brown
(74) *Attorney, Agent, or Firm* — Locke Lord LLP

(57) ABSTRACT

A method for controlling a variable speed drive comprising Ni low-voltage power cells connected in series for each phase among multiple phases, i being a phase index. The method comprises repeating P iterations comprising: activating at least one cell of one or more phases and deactivating the other power cells of the variable speed drive, wherein the at least one activated cell is selected on the basis of predefined activation controls depending on an iteration index; and receiving at least one output voltage of the variable speed drive across the terminals of the electrical device for at least one phase. The method further comprises, at the end of the P iterations, determining, from the measured output voltages, values of rectified voltage at the output of respective rectification stages of the power cells, and storing the rectified voltages obtained, which are respectively associated with the power cells.

20 Claims, 3 Drawing Sheets

(56) References Cited

OTHER PUBLICATIONS

English Language Machine Translation of Chinese Patent Application Publication No. CN108933543, published on Dec. 4, 2018, 7 pages.
Search Report and Written Opinion for French Patent Application No. 1872818 dated Oct. 18, 2019, 10 pages.

* cited by examiner

CONTROL OF POWER CELLS OF A VARIABLE SPEED DRIVE ON THE BASIS OF RECTIFIED VOLTAGES

TECHNICAL FIELD OF THE INVENTION

The invention relates to the management of a variable speed drive responsible for supplying power to an electrical device such as an electric motor, for example.

PRIOR ART

According to one power topology, a high voltage is provided by a variable speed drive by connecting a certain number of low-voltage converters in series (these then being called power cells). Control of these power cells allows a multiple-level, or multi-level, voltage to be provided, each power cell adding a voltage allowing successive voltage levels to be reached.

Low voltage, according to European standards, is understood to mean voltages of between 0 and 1000 volts AC and between 0 and 1500 volts DC. High voltage is understood to mean voltages higher than 1000 volts AC and higher than 1500 volts DC.

For example, the variable speed drive can comprise N power cells, N being greater than or equal to 2. When the variable speed drive provides a three-phase power supply, it can comprise 3*N power cells, N power cells being dedicated to each of the three phases.

In multi-level variable speed drive topologies, only the motor voltage measurements may be available to reduce the cost of the product, and not the individual rectified voltages, or DC bus voltages DC. These rectified voltages correspond to the voltages at the output of a rectifier bridge (chiefly diode bridge or thyristor bridge) at the input of each of the power cells of the variable speed drive.

In the multilevel architecture mentioned above, the output voltages of each power cell are generated by applying a duty cycle to the rectified voltage of the power cell. The rectified voltage, or DC bus voltage, of each power cell is therefore necessary in order to calculate the duty cycles to be applied in order to reach a target output voltage on the motor.

According to solutions in the prior art, a fixed rectified voltage common to all power cells is considered, which is based on a theoretical value of the DC buses in the ideal case.

However, such a solution causes an error in the output voltage applied to the motor, because, in practice, the rectified voltages of the power cells are different from one another. This is because various perturbations are present and affect the levels of the rectified voltages of each power cell (voltage at the input of the variable speed drive, transformer, etc.).

Such an error can be compensated for by motor voltage measurements, but this involves having precise motor voltage sensors so that a corrector is able to enslave the voltages generated at the output of the variable speed drive. The voltage reference may therefore be made up of two terms: a direct term and a correction deriving from the corrector. The greater the magnitude of the error in the direct term using knowledge of the rectified voltages, the more the corrector will have to take action to reject this error. The production of the voltage will therefore depend on the dynamics of the corrector and impacts on the overall performance of the control.

Moreover, additional sensors may be provided in order to provide a diagnosis for the power cells. For example, a temperature probe may be provided on the transformer upstream of the variable speed drive, for example. However, there is no diagnosis provided for the input stage of the variable speed drive.

There is therefore a need to improve control of the output voltage delivered by the variable speed drive to the motor by rejecting the various perturbations of the electric power conversion system (variable gain of the transformer, downtime on the switching action of switches of the power cells).

The present invention overcomes the aforementioned disadvantages.

SUMMARY OF THE INVENTION

A first aspect of the invention relates to a method for determining rectified voltages of power cells of a variable speed drive responsible for supplying power to an electrical device, the variable speed drive comprising Ni low-voltage power cells connected in series for each phase among multiple phases, N being greater than or equal to 2, and i being a phase index. The method comprises the following operations:
repeating the following P iterations, P being a predefined integer greater than or equal to 2:
  activating at least one cell of one or more phases and deactivating the other power cells of the variable speed drive, wherein at least one activated cell is selected on the basis of predefined activation controls depending on an iteration index;
  receiving at least one output voltage of the variable speed drive across the terminals of the electrical device for at least one phase;
wherein the method moreover comprises, at the end of the P iterations:
determining, from the measured output voltages of the variable speed drive, values of rectified voltage at the output of respective rectification stages of the power cells of the variable speed drive;
  storing the determined rectified voltage values, which are respectively associated with the power cells of the variable speed drive.

The term "motor voltage" is used hereinbelow to denote a voltage across the terminals of the electrical device supplied with power by the variable speed drive.

According to one embodiment, the integer P and the activation controls can be predefined in the form of a matrix comprising P rows or columns per phase, representing the activation controls and equal in rank to the number of power cells of the variable speed drive.

It is thus possible to access all rectified voltage values by minimizing the number of measurements taken.

In addition, the variable speed drive comprises N power cells for each phase among three phases and, for each iteration of index t, t being between 1 and P:

$$M\_t = KALL\_t \times VBALL;$$

wherein KALL_t represents a matrix having 3 rows and 3*N columns comprising [K1−K2 K0; K0 K2−K3; −K1 K0 K3], wherein K1, K2 and K3 are the respective activation controls of the three phases and are vectors of size N taking binary values, a first value corresponding to an activation and a second value corresponding to a deactivation, wherein K0 is a zero vector of size N,
wherein VBALL is a column vector of length 3*N made up as follows [VB1; VB2; VB3], wherein VB1, VB2 and VB3 are vectors of size N of the rectified voltages of the power cells of the three respective phases;

wherein M_t is a vector of three voltages measured across the terminals of the electrical device for a given iteration, the three measured voltages corresponding to the (being determinable from the) three output voltages of the variable speed drive.

According to one embodiment, P is equal to the number of power cells of the variable speed drive and, on each iteration, a single power cell can be activated, the power cells activated for two different iterations being separate.

Such an embodiment allows easy access to each of the rectified voltages of the power cells.

The method according to the invention thus allows access to the rectified voltages of the power cells without the need to add additional sensors.

According to one embodiment, the method can moreover comprise during a current phase of supplying power to the electrical device, for each power cell, adapting an order for controlling the power cell on the basis of the rectified voltage associated therewith.

This embodiment thus allows the production of a target motor voltage requiring only little or even no correction. Better dynamics in the production of the target motor voltage are thus allowed.

In addition, the adapting of an order for controlling a power cell comprises determining a duty cycle of the power cell on the basis of the rectified voltage associated with the power cell.

According to one embodiment, the method can moreover comprise analysing the rectified voltages obtained with the aim of detecting a deviation from nominal operation.

It is thus possible to foresee faults in the power stage and to perform preventive maintenance.

According to one embodiment, the method can be repeated at multiple separate instants, and the analysis of the rectified voltages can comprise determining trends in the variation of the rectified voltages of the power cells, and comparing the trends with nominal operation.

It is thus possible to foresee faults in the power stage and to perform preventive maintenance.

According to one embodiment, the method can be initiated following stoppage of the electrical device.

In this way, the method does not interrupt the operation of the electrical device.

In addition, the method can be initiated automatically on detection of stoppage of the electrical device.

No intervention by an operator is thus required. In addition, the method can be initiated automatically at a given frequency, on stoppage of the electrical device.

Alternatively, the method can be initiated manually following stoppage of the electrical device.

A check on the operation of the power cells can thus be implemented by an operator.

A second aspect of the invention relates to a computer programme executable by a processor and comprising instructions so as, when it is executed by the processor, to implement the steps of a method according to the first aspect of the invention.

A third aspect of the invention relates to a device for controlling a variable speed drive responsible for supplying three-phase power to an electrical device, the variable speed drive comprising Ni low-voltage power cells connected in series for each phase among multiple phases, N being greater than or equal to 2 and i being a phase index. The control device comprises:

a processor capable of controlling, by means of an output interface, the repetition of the following P iterations, P being a predefined integer greater than or equal to 2:

activating at least one cell of one or more phases and deactivating the other power cells of the variable speed drive, wherein the at least one activated cell is selected on the basis of predefined activation controls depending on an iteration index;

receiving, via an input interface, at least two output voltages of the variable speed drive across the terminals of the electrical device for two phases;

the processor moreover being capable of determining, at the end of the P iterations, from the measured output voltages of the variable speed drive, values of rectified voltage at the output of respective rectification stages of the power cells of the variable speed drive, a memory storing the determined rectified voltage values, which are respectively associated with the power cells of the variable speed drive.

A fourth aspect of the invention relates to a variable speed drive responsible for supplying three-phase power to an electrical device, the variable speed drive comprising N low-voltage power cells connected in series for each phase among three phases, N being greater than or equal to 2, and comprising a control device according to the third aspect of the invention.

BRIEF DESCRIPTION OF THE FIGURES

Merely by way of example, the embodiments of the invention will be described with reference to the drawings, among which.

DETAILED DESCRIPTION

Figure 1:
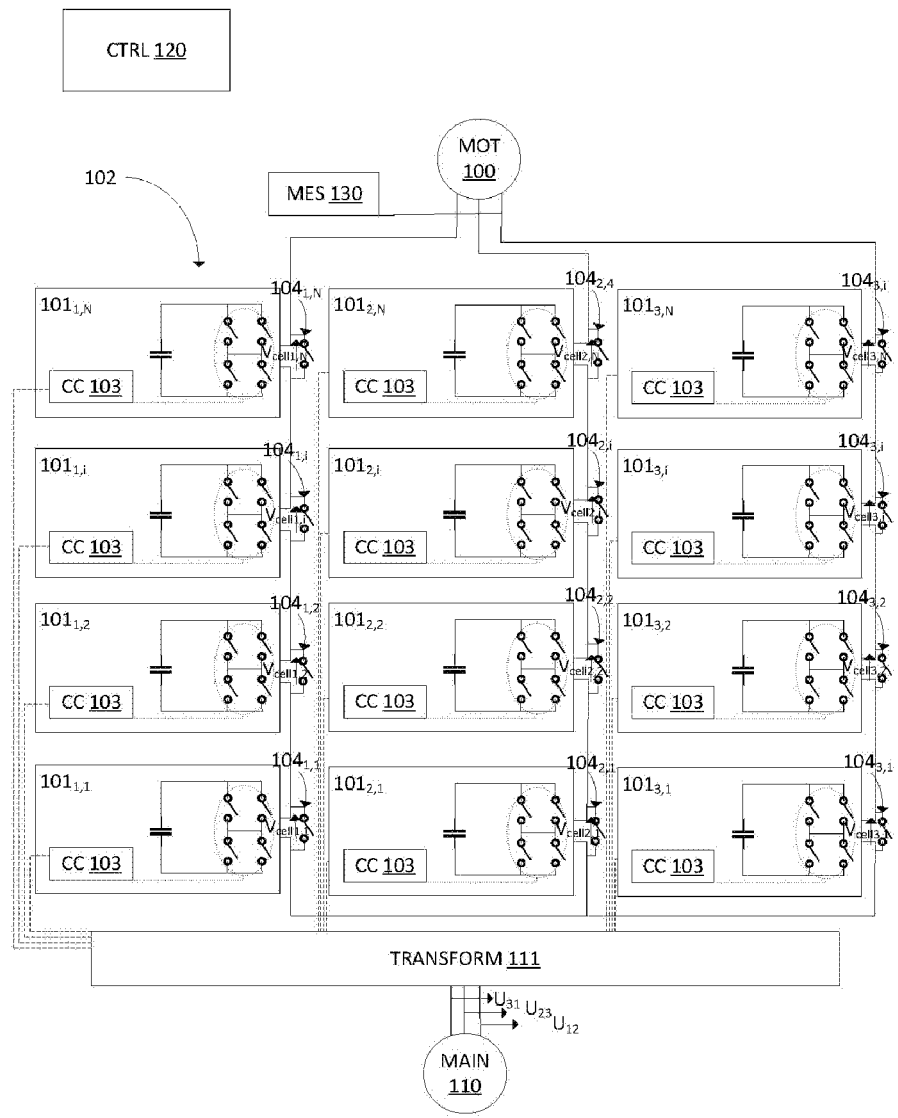
FIG. 1 illustrates a system for controlling the supply of power to an electrical device according to one embodiment of the invention.

FIG. 1 presents a system for supplying power to an electrical device, such as an electric motor 100 (for example an induction motor), supplied with power by a variable three-phase power supply. Such a motor is given as an illustration, but should not limit the invention to this single example, the invention being able to be applied to any electrical device supplied with power by a variable speed drive comprising multiple power cells.

The variable speed drive comprises a transformer 111 receiving a variable three-phase power supply from the mains 110. The transformer 111 may be a multi-winding transformer capable of delivering three-phase voltages to multiple power cells, which are described below.

The variable speed drive 102 according to the invention can comprise a power stage comprising one or more low-voltage power cells 101. In the example illustrated in FIG. 1, the motor receives a three-phase power supply and the variable speed drive 102 comprises 3*N power cells, with N power cells dedicated to each phase, N being greater than or equal to 2.

With reference to FIG. 1, a system having 3*N power cells is represented. However, the invention applies equally to a system having 3*(N+1) power cells, one power cell being reserved per phase in case one of the active power cells fails. Such an example is given solely for illustrative purposes. The example of a three-phase power supply is considered, but the invention also applies to a system having N or N+1 power cells. The invention also applies to a system having N+2 (or more than N+2) power cells (or 3*(N+2) for a three-phase power supply), with two replacement power cells per phase. Furthermore, the invention is able to be applied to a number of phases other than three. Moreover, the number of power cells can differ per phase, in which case each phase comprises a number Ni of power cells, i being a phase index. Solely by way of illustration, the narrative that follows considers the case of a three-phase power supply with the same number of power cells N for each of the phases.

Each power cell 101 receives at its input the three-phase power supply from the secondary of the transformer 111 and can comprise a rectifier (not represented in FIG. 1) at its input, the rectifier being capable of rectifying the three-phase power supply received so as to provide a DC voltage. The DC rectified voltage obtained for each power cell 101 is also called the DC bus voltage, DC, or bus voltage. The rectifier can comprise a diode bridge, a thyristor bridge or any other known system for rectifying a voltage.

At the output of the rectifier, each power cell 101 can comprise a capacitor capable of storing electrical energy, and a module for generating a pulse width modulation PWM signal. Such a generating module can comprise an H-bridge, comprising four switches controlled in twos. An electronic power system using a chop voltage principle of this kind applies a voltage proportional to one or more rectified voltages to the motor 100 per phase. On average, the applied proportion corresponds to the ratio between the target voltage at the output of the power cell and the rectified reference voltage (defined below). The operation of an H-bridge is well known and will not be described further in the present application.

The switches of the H-bridge can be transistors of IGBT (Insulated Gate Bipolar Transistor) type, which have the advantage of being able to be switched rapidly.

The switches of a power cell 101 are controlled by a control cell 103 of the power cell 101.

The system moreover comprises a control device 120 capable of controlling the operation of the power cells 101 of the variable speed drive 102 so as to control the supply of electric power to the motor 100. To this end, the control device 120 can control the control cells 103 of the power cells 101. The control device 120 can moreover control switches 104 allowing a subset of the N power cells for each phase to be connected in series. As a variant, these switches are controlled by the control device 120 by means of the control cells 103.

The power cells 101 can receive control signals from the control device 120, on the basis of which control signals the power cells 101 can control the switching action of the switches of the H-bridge.

The three-phase voltages, or motor voltages, supplying power to the motor 100 are thus obtained by summing the PWM output voltages of the power cells 101, denoted by $V_{cell}$ in FIG. 1, for which the switches 104 are open (called "active cells" below). The switches 104 allow the power cells 101 to be "bypassed" without controlling the switches of the H-bridge of the power cells. Such switches 104 are optional, however, in that the power cells 101 can be deactivated by controlling their H-bridge so as to have a zero duty cycle, and therefore a zero output voltage from the power cell.

The system according to the invention moreover comprises a measuring means 130 for measuring the three-phase voltages applying power to the motor. The measuring means 130 is capable of transmitting the measured motor voltage(s) to the control device 120.

The control device 120 according to the invention is configured to control the various power cells 101, and the bypass switches, directly or indirectly (directly or via the control cells 103). In particular, according to the invention, the control device 120 is capable of controlling the power cells 101 or the bypass switches 104 so that some cells do not provide a voltage, and therefore the motor voltage is provided only by one power cell, for example. Thus, in an embodiment in which a single power cell is activated at a time, a measured motor voltage allows access to the output voltage of the chosen power cell, as explained in detail later on, and it thus allows access to the DC bus voltage on the basis of the duty cycle applied to the power cell.

Figure 2:
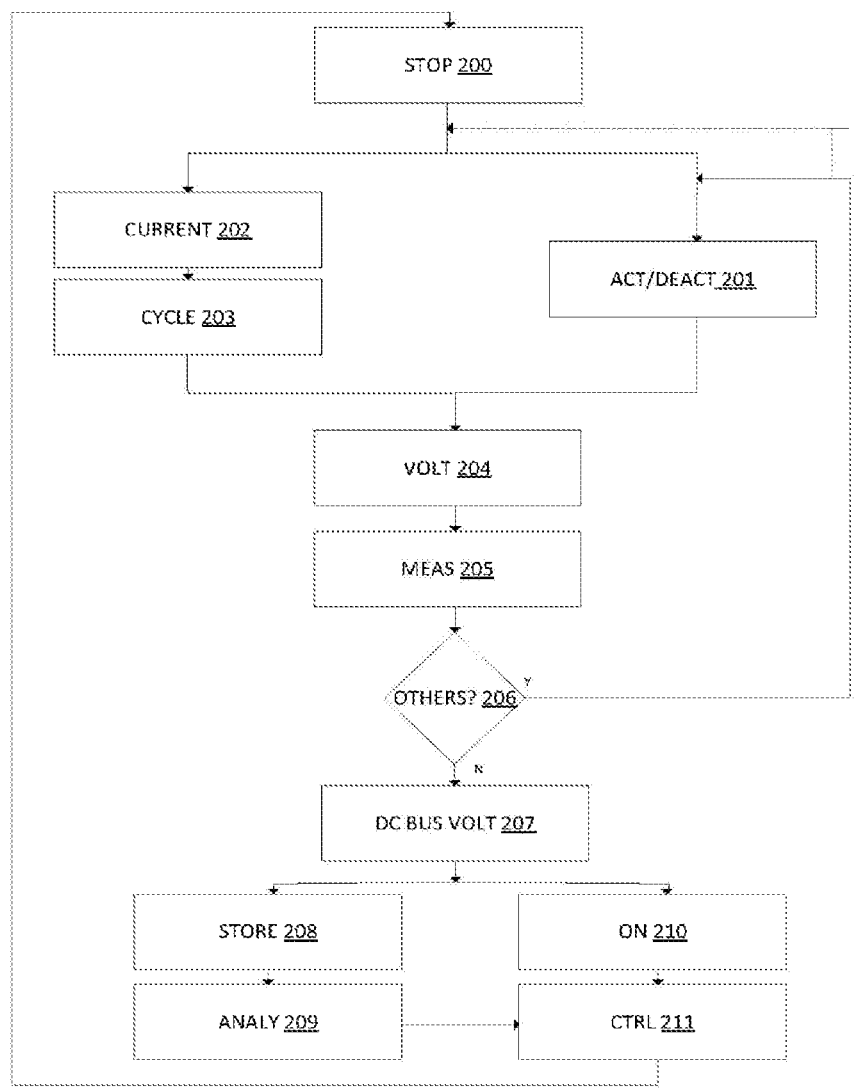
FIG. 2 is a chart illustrating the steps of a method according to one embodiment of the invention.

FIG. 2 is a chart illustrating the steps of a method according to one embodiment of the invention.

In a step 200, the method according to the invention is implemented. Such an implementation may result from the stoppage of the motor 100. For example, following the stoppage of the motor 100, the method is triggered automatically, or manually, via a man-machine interface of the control device 120.

In a step 201, the control device 120 controls the switches 104 or the H-bridges of the various cells, so as to activate a subset of the power cells of the variable speed drive 102, for example solely the first cell $101_{1,1}$ of the first phase. The operation of embodiments in which multiple power cells are activated simultaneously will be described later on, FIG. 2 being described within the framework of an embodiment based on successive activations of the power cells (a single power cell activated on each iteration).

At the same time, in a step 202, the control device 120 determines a voltage value to be applied to the variable speed drive 102. This voltage to be applied may be direct, or computed by a current regulator, for example, allowing the output current of the variable speed drive flowing through the motor 100 to be brought under control.

In a step 203, a duty cycle to be applied to the activated power cell $101_{1,1}$ is determined by the control device 120 in order to produce a target output voltage $V_0$ to be applied to the motor 100. For the other, inactive cells, either the bypass switches 104 are closed or the duty cycles are zero.

The variable speed drive 102 is supplied with power in step 204 and the power cells 101 are controlled in accordance with steps 202 and 203.

The motor voltage is then measured in a step 205, for example by a sensor, and then received by the control device 120, the motor voltage being provided by the first cell $101_{1,1}$.

In a step 206, the control device 120 determines whether or not all the power cells 101 have been successively activated. If this is the case, the method moves to step 207. More generally, a number of iterations P is predefined, P being greater than or equal to 2. In this way, an iteration index can be compared with P in step 207. If the iteration index is equal to P, the method moves to step 207.

Otherwise, the method returns to step 201, by activating the next power cell (for example the power cell $101_{1,2}$ after the power cell $101_{1,1}$), or the next power cells, in the general case that will be described later on, and by deactivating all other power cells 101. In an alternative embodiment, the method returns to step 201 but also to step 202. In this alternative embodiment, steps 202 and 203 are implemented for each iteration of the method, in a distinct manner.

On the basis of the motor voltages measured in successive steps 205, the rectified voltages of the power cells are deduced in a step 206 by the control device 120 according to the invention.

In order to determine the rectified voltage of a power cell, the control device 120 takes into account the measured motor voltage and the duty cycle that has been applied.

It is worth noting that, in the embodiment in which the method is iterated 3*N times (when the variable speed drive comprises N power cells per phase among three phases) by activating a single power cell each time, the rectified voltage of the power cell activated during a given iteration can be determined at the end of the given iteration (rather than at the end of all of the iterations).

At the end of determination of the rectified voltages of the power cells 101 of the variable speed drive 102, the method moves to step 208.

In step 208, the rectified voltages of the power cells of the variable speed drive are stored in a memory of the control device 120. The rectified voltages can be stored by replacing the previous values of the rectified voltages. As a variant, the rectified voltages are stored in association with the date of implementation of the iteration of the method according to the invention, allowing implementation of tracking of the variation of the rectified voltages for each of the power cells 101 of the variable speed drive 102.

In optional step 209, an analysis of the rectified voltages is implemented. Such an analysis may comprise a comparison with nominal rectified voltages, and the triggering of a warning in the event of deviation from one of the nominal rectified voltages. If the rectified voltages are stored in association with respective dates, a trend in the variation of the rectified voltage can be determined for each power cell 101, and a warning can be generated on the basis of such a trend.

The generation of a warning allows preventing maintenance to be implemented.

Independent of steps 208 and 209, the variable speed drive changes to "activated" or "ready" mode in a step 210, allowing the motor 100 to be started in a step 211.

Following steps 209 and 210, the control device 120, on receiving a motor control, determines a target motor voltage and controls the variable speed drive 102 on the basis of the target motor voltage and on the basis of the rectified voltages determined previously, in step 211. To this end, the control device 120 determines respective duty cycles for the power cells 101. The production of the target motor voltage is then more precise in that the rectified voltages of the power cells are known and can be updated on a regular basis (for example whenever the electric motor 100 stops).

According to some embodiments, a variable speed drive of this kind moreover comprises a corrector correcting the controls of the input of the control device 120 on the basis of the voltages measured on the electric motor 100. In this case, the role of such a corrector is scaled down according to the invention, allowing the dynamics of production of the output voltages applied to the motor 100 to be improved.

The method can then be repeated, at a later time, for example following renewed stoppage of the electric motor 100 in a step 200.

The method can alternatively be repeated at a given frequency, for example every week, following stoppage of the electric motor. In this case, a minimum interval of one week separates the implementations of two iterations of the method.

With reference to FIG. 2, a particular embodiment involving the activation of a single power cell on each iteration has been described. Such an embodiment is simple to implement and the rectified voltage of each power cell is easily accessible once the motor voltages have been measured. More generally, the invention can provide for, on each iteration, the activation, in step 201, of a subset of at least one power cell, the production of an output voltage or of output voltages by the subset in step 204 and the measurement of one or two motor voltages in step 205. This is because it is unnecessary to measure more than two motor voltages, as a third motor voltage can deduced from the first and second motor voltages (see voltages U12, U23 and U31 described below).

The power cells to be activated on each iteration and the motor voltages to be measured on each iteration can be determined from a predefined matrix. Such a matrix is predefined so as to ensure that, at the end of all iterations, a sufficient number of equations has been obtained to determine the value of each of the unknowns of the system of equations (the 3*N rectified voltages of the power cells, for example, when the variable speed drive comprises 3*N power cells). To this end, the predefined matrix is equal in rank to the number of unknowns (or 3*N).

If i is the phase index (varying from 1 to 3) and k is the power cell index within a phase (varying from 1 to N in a power stage having 3*N power cells), a power cell of phase i and index k:
  is activated with a duty cycle r (between −1 and 1);
  has a rectified voltage VB(i,k), which constitutes an unknown of the system;
  provides a potential difference r×VB(i,k)

Column vectors VBi having N components can be defined, each component with the index k in the value of the rectified voltage VB(i,k).

A combination of controls for activating cells of a leg of the power stage dedicated to the phase i can be represented by the line vector Ki having N values (0: inactive power cell, 1: active power cell).

The potential difference Vi generated by the leg with the index i is equal to the sum of the potential differences of all cells of the leg, or: Vi=Ki×VBi The measuring means 130 described above may be capable of providing three phase-phase voltages between U12=V1−V2, U23=V2−V3, and U31=V3−V1. As a variant, the measuring means 130 is designed to measure the voltages V1, V2 and V3 directly.

The three measurements at a time t corresponding to an iteration of the method (t being able to be a date or an iteration index for the method), in particular of step 205, may be associated in a column vector M_t equal to [U12; U23; U31], or: M_t=KALL_t×VBALL in which K0 is a zero vector of identical dimension to K1, K2 or K3, and KALL_t represents a matrix having 3 rows and 3*N columns made up as follows: [K1−K2 K0; K0 K2−K3; −K1 K0 K3];

and VBALL represents a column vector of length 3N made up as follows: [VB1; VB2; VB3].

The combinations K1 to K3 are chosen according to the invention so that a matrix KALL_$t_{ALL}$, to 3*P rows and 3*N columns, constructed for times (or iterations) t1, t2, up to tP by "stacking" or aggregation of the matrices KALL_$t_u$ for u varying between 1 and P, KALL_tALL is a matrix of rank 3*N, so as to be able to determine the 3*N unknowns of the system (the rectified voltages of the power cells).

The embodiment described with reference to FIG. 2 is a special case of a general embodiment of this kind.

This special embodiment provides for the activation of a single cell at each time $t_u$, u being an index between 1 and 3*N.

Upon activation of the cell with the index "u−INT[(u−1)/N] *N" of the leg "1+INT[(u−1)/N]" of the power stage, where INT represents the function for the integer part, the following is obtained with a case in which N=3 (given by way of example, without this limiting the scope of the invention):

at time t1, K1=[1 0 0]; K2=[0 0 0]; K3=[0 0 0]. The matrix KALL_t1 is [1 0 0 0 0 0 0 0 0; 0 0 0 0 0 0 0 0 0; −1 0 0 0 0 0 0 0];

at time t2, K1=[0 1 0]; K2=[0 0 0]; K3=[0 0 0]. The matrix KALL_t2 is [0 1 0 0 0 0 0 0 0; 0 0 0 0 0 0 0 0 0; 0 −1 0 0 0 0 0 0].

By constructing each matrix KALL_tu, the first row is made up of 0s except for the u-th element, which is 1. It is understood that after 3×3 times according to the rule set out above, the first 9 rows taken together form the identity matrix, which guarantees the rank 9 (or the number of unknowns of the system).

Figure 3:
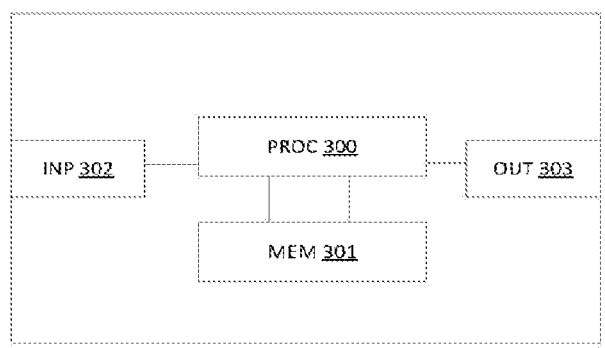
FIG. 3 illustrates the structure of a control device according to one embodiment of the invention.

FIG. 3 illustrates the structure of a control device 120 according to one embodiment of the invention.

The control device 120 comprises a processor 300 configured to communicate unidirectionally or bidirectionally, via one or more buses, with a memory 301 such as a memory of "Random Access Memory", RAM type, or a memory of "Read Only Memory", ROM, type or any other type of memory (Flash, EEPROM, etc).

The memory 301 is capable of storing, permanently or temporarily, at least some of the data used and/or deriving from the implementation of the method according to the invention. In particular, the memory 301 is capable of storing the rectified voltage values of the power cells, optionally in association with respective dates.

The processor 300 is capable of executing instructions for implementing the steps of the method according to the invention, illustrated with reference to FIG. 2.

The control device 120 can moreover comprise an input interface 302 and an output interface 303 in order to communicate with the other entities of the system according to the invention.

In particular, the input interface 302 is capable of receiving speed instructions and the processor 300 is capable of determining the target motor voltages (one target motor voltage per phase) from the speed instructions.

The output interface 303 is capable of providing control orders to the power cells 101 so that they produce the duty cycles, via their H-bridges in particular. To this end, the control orders can comprise the orders for switching switches of IGBT type, for example, of the H-bridge in part (solely the orders for the two IGBT switches from the top for each power cell) or totally (the four IGBT switches). These switching orders can be computed by the control device 120 by comparing the reference voltages with triangular-waveform signals corresponding to each power cell. Such a technique is well known and will not be described in more detail.

Although the present invention has been described above with reference to special embodiments, the invention is in no way limited to the forms described. The invention is limited only by what is defined in the claims, and modes of embodiment other than those described above can be included within the scope of the claims.

Moreover, although the embodiments have been described above as a combination of components and/or functions, it will be understood that alternative embodiments can be obtained by other combinations of components and/or functions without, however, departing from the scope of the invention.

The invention claimed is:

1. Method for determining rectified voltages of power cells of a variable speed drive responsible for supplying power to an electrical device, the variable speed drive comprising Ni low-voltage power cells connected in series for each phase among multiple phases of the power supply, N being greater than or equal to 2, and i being a phase index, characterized in that the method comprises the following operations:
   a) repeating the following P iterations, P being a predefined integer greater than or equal to 2 or equal to the number of power cells of the variable speed drive:
       activating a selected one cell of one or more phases of the power supply and deactivating the other power cells of the variable speed drive, wherein the selected one activated cell is selected on the basis of predefined activation controls depending on an iteration index;
       receiving at least one output voltage of the variable speed drive across the terminals of the electrical device for the selected one activated cell at least one phase;
   wherein the method moreover comprises, at the end of the P iterations:
   b) determining values of the rectified voltages of the P power cells represented in a first matrix in a matrix equation, the first matrix multiplied by a second matrix representing the predefined activation controls of the P power cells in the matrix equation, a matrix product in the matrix equation being a third matrix representing, measured output voltages of the variable speed drive in the matrix equation, the values of the rectified voltages being at the output of respective rectification stages of the power cells of the variable speed drive;
   c) storing the determined rectified voltage values, which are respectively associated with the power cells of the variable speed drive; and
   d) controlling a duty cycle of the selected one activated power cell to adjust a pulse width modulated output voltage of the selected one activated power cell, based on a stored determined rectified voltage value associated with the selected one activated power cell.

2. Method according to claim 1, wherein the integer P and the activation controls are predefined in the form of a matrix comprising P rows or columns per phase, representing the activation controls and equal in rank to the number of power cells of the variable speed drive.

3. Method according to claim 2, wherein the variable speed drive comprises N power cells for each phase among three phases and, for each iteration of index t, t being between 1 and P:
   controlling respective duty cycles of the power cells to adjust respective output voltages of the power cells, based on determined rectified voltages of the respective power cells, as determined by means of repetition of the following P iterations:

$$M\_t = KALL\_t \times VBALL;$$

wherein KALL_t represents a matrix having 3 rows and 3*N columns comprising [K1−K2 K0; K0 K2−K3; −K1 K0 K3], wherein K1, K2 and K3 are the respective activation controls of the three phases and are vectors of size N taking binary values, a first value corresponding to an activation and a second value corresponding to a deactivation, wherein K0 is a zero vector of size N, wherein VBALL is a column vector of length 3N made up as follows [VB1; VB2; VB3], wherein VB1, VB2 and VB3 are vectors of size N of the rectified voltages of the power cells of the three respective phases;

wherein M_t is a vector of three voltages measured across the terminals of the electrical device for a given iteration, the measured motor voltages corresponding to the (being determinable from) three output voltages of the variable speed drive.

4. Method according to claim 1, wherein P is equal to the number of power cells of the variable speed drive and in which, on each iteration, a single power cell is activated, the power cells activated for two different iterations being separate.

5. Method according to claim 1, the method moreover comprising, during a current phase of supplying power to the electrical device, for each power cell, adapting an order for controlling the power cell on the basis of the rectified voltage associated therewith.

6. Method according to claim 5, wherein the adapting of an order for controlling a power cell comprises determining a duty cycle of the power cell on the basis of the rectified voltage associated with the power cell.

7. Method according to claim 1, moreover comprising analysing the rectified voltages obtained with the aim of detecting a deviation from nominal operation.

8. Method according to claim 1, wherein the method is repeated at multiple separate instants, and wherein the analysing of the rectified voltages comprises determining trends in the variation of the rectified voltages of the power cells, and comparing the trends with nominal operation.

9. Method according to claim 1, the method being initiated following stoppage of the electrical device.

10. Method according to claim 9, wherein the method is initiated automatically on detection of stoppage of the electrical device.

11. Method according to claim 9, wherein the method is initiated manually following stoppage of the electrical device.

12. Computer program product comprising a non-transitory computer readable medium having processor readable instructions stored thereon, which when executed by a processor, causes the processor to implement the method according to claim 1.

13. Device for controlling a variable speed drive responsible for supplying power to an electrical device, the variable speed drive comprising Ni low-voltage power cells connected in series for each phase among multiple phases of the power supply, N being greater than or equal to 2 and i being a phase index, the control device comprising:

a processor configured to, by means of an output interface, the repetition of the following P iterations, P being a predefined integer greater than or equal to 2 or equal to the number of power cells of the variable speed drive;

activating a selected one cell of one or more phases of the power supply and deactivating the other power cells of the variable speed drive, wherein the selected one activated cell is selected on the basis of predefined activation controls depending on an iteration index;

receiving, via an input interface, at least two output voltages of the variable speed drive across the terminals of the electrical device for two phases;

the processor further configured to determine, at the end of the P iterations, values of the rectified voltages of the P power cells represented in a first matrix in a matrix equation, the first matrix multiplied by a second matrix representing the predefined activation controls of the P power cells in the matrix equation, a matrix product in the matrix equation being a third matrix representing measured output voltages of the variable speed drive in the matrix equation, the values of the rectified voltages being at the output of respective rectification stages of the power cells of the variable speed drive;

a memory storing the determined rectified voltage values, which are respectively associated with the power cells of the variable speed drive; and wherein the processor controls a duty cycle of the selected one activated power cell to adjust a pulse width modulated output voltage of the selected one activated power cell, based on a stored determined rectified voltage value associated with the selected one activated power cell.

14. Variable speed drive responsible for supplying three-phase power to an electrical device, the variable speed drive comprising Ni low-voltage power cells connected in series for each phase among multiple phases, N being greater than or equal to 2 and i being a phase index, and a control device according to claim 13.

15. Method for determining rectified voltages of power cells of a variable speed drive responsible for supplying power to an electrical device, the variable speed drive comprising Ni low-voltage power cells connected in series for each phase among multiple phases of the power supply, N being greater than or equal to 2, and i being a phase index, characterized in that the method comprises the following operations:

a) repeating the following P iterations, P being a predefined integer greater than or equal to 2:
activating a selected one cell of one or more phases of the power supply and deactivating the other power cells of the variable speed drive, wherein the selected one activated cell is selected on the basis of predefined activation controls depending on an iteration index;
receiving at least one output voltage of the variable speed drive across the terminals of the electrical device for at least one phase;

wherein the method moreover comprises, at the end of the P iterations:

b) determining, measured output voltages of the variable speed drive, the values of the rectified voltages being at the output of respective rectification stages of the power cells of the variable speed drive;

c) storing the determined rectified voltage values, which are respectively associated with the power cells of the variable speed drive; and d) controlling a duty cycle of the selected one activated power cell to adjust a pulse width modulated output voltage of the selected one activated power cell, based on a stored determined rectified voltage value associated with the selected one activated power cell, wherein the integer P and the activation controls are predefined in the form of a matrix comprising P rows or columns per phase, representing the activation controls and equal in rank to the number of power cells of the variable speed drive, wherein the variable speed drive comprises N power cells for each phase among three phases and, for each iteration of index t, t being between 1 and P;

controlling respective duty cycles of the power cells to adjust respective output voltages of the power cells, based on determined rectified voltages of the respective power cells, as determined by means of repetition of the following P iterations:

$M\_t = KALL\_t \times VBALL$;

wherein KALL t represents a matrix having 3 rows and 3*N columns comprising [K1−K2 KO; KO K2−K3; −K1 KO K3], wherein K1, K2 and K3 are the respective activation controls of the three phases and are vectors of size N taking binary values, a first value corresponding to an activation and a second value corresponding to a deactivation, wherein KO is a zero vector of size N, wherein VBALL is a column vector of length 3N made up as follows [VB1; VB2; VB3], wherein VB1, VB2 and VB3 are vectors of size N of the rectified voltages of the power cells of the three respective phases;

wherein M_t is a vector of three voltages measured across the terminals of the electrical device for a given iteration, the measured motor voltages corresponding to the (being determinable from) three output voltages of the variable speed drive.

16. Method according to claim 15, wherein P is equal to the number of power cells of the variable speed drive and in which, on each iteration, a single power cell is activated, the power cells activated for two different iterations being separate.

17. Method according to claim 15, the method moreover comprising, during a current phase of supplying power to the electrical device, for each power cell, adapting an order for controlling the power cell on the basis of the rectified voltage associated therewith.

18. Method according to claim 17, wherein the adapting of an order for controlling a power cell comprises determining a duty cycle of the power cell on the basis of the rectified voltage associated with the power cell.

19. Device for controlling a variable speed drive responsible for supplying power to an electrical device, the variable speed drive comprising Ni low-voltage power cells connected in series for each phase among multiple phases, N being greater than or equal to 2 and i being a phase index, using the method of claim 15.

20. Variable speed drive responsible for supplying three-phase power to an electrical device, the variable speed drive comprising Ni low-voltage power cells connected in series for each phase among multiple phases, N being greater than or equal to 2 and i being a phase index, and a control device according to claim 19.

* * * * *